United States Patent [19]

Nomura

[11] Patent Number: 5,078,537

[45] Date of Patent: Jan. 7, 1992

[54] CONNECTING DEVICE

[75] Inventor: Ryoichi Nomura, Toyama, Japan

[73] Assignee: NIC Autotec Co., Ltd., Toyama, Japan

[21] Appl. No.: 607,519

[22] Filed: Nov. 1, 1990

[51] Int. Cl.$^5$ ............................................. B25G 3/00
[52] U.S. Cl. ............................ 403/406.1; 403/405.1; 411/85; 411/92
[58] Field of Search .................... 403/21, 22, 179, 203, 403/261, 291, 314, 316, 372, 397, 406.1, 405.1, 409.1, 407.1; 411/92, 95, 104, 84, 85, 432

[56] References Cited

U.S. PATENT DOCUMENTS

| 713,334 | 11/1902 | Niehaus | 403/22 |
| 1,523,372 | 1/1925 | Hoerr | 403/22 |
| 1,671,757 | 5/1928 | Allen | 411/104 |
| 2,804,180 | 8/1957 | Richardson | 403/21 |
| 2,944,642 | 7/1960 | Evans | 403/22 |
| 3,005,292 | 10/1961 | Reiland | 411/84 |
| 4,741,582 | 5/1988 | Peroni | 403/406.1 X |
| 4,758,124 | 7/1988 | Ingeberg | 411/85 |
| 4,934,886 | 6/1990 | Aikens | 411/85 |
| 4,948,313 | 8/1990 | Zankovich | 411/85 |

FOREIGN PATENT DOCUMENTS

| 1923669 | 4/1978 | Fed. Rep. of Germany | 403/22 |
| 2416371 | 10/1979 | France | 403/21 |
| 2468784 | 5/1981 | France | 411/85 |
| 2533272 | 3/1984 | France | 403/21 |

OTHER PUBLICATIONS

Publication, "Kindorf Channels and Accessories", Kindorf Steel City Division, 1967.
Publication, "New Holdnut for Kindorf Channel", Kindorf Steel City Division, Jul. 27, 1967.

Primary Examiner—Andrew V. Kundrat
Attorney, Agent, or Firm—Frishauf, Holtz, Goodman & Woodward

[57] ABSTRACT

A connecting device comprising a nut and a nut holder made of synthetic resin for holding the nut in a predetermined position in a T-groove made in one side of an elongated standardized member. The nut holder consists of an elastically deformable portion and two projections integrally formed with the opposing ends of the deformable portion. The deformable portion has a width slightly greater than that of the T-groove. The nut is held between the projections of the nut holder, and the nut holder is inserted into the T-groove. Once in the T-groove, the deformable portion of the nut holder remains elastically deformed, thus holding the nut at the predetermined position.

3 Claims, 5 Drawing Sheets

CONNECTING DEVICE

BACKGROUND OF THE INVENTION

1. Field of the Invention

The present invention relates to a connecting device for connecting a first member, such as a long aluminum member, to a second member, said device having a nut to be inserted in a T-groove cut in one side of the first member.

2. Description of the Prior Art

Hitherto, in order to connect members of standard sizes and shapes, thereby to build frames for machines or buildings, the bolts fixed to some of the standardized members of a first group are put into screw engagement with the nuts inserted in the T-grooves cut in the standardized members of the second group. The nuts can slide in the T-grooves, which are larger than the nuts. Therefore, any first-group member can be connected to a second-group member, at any position with respect to the second-group member. To secure the first-group member at the desired position, the nut in the T-groove of the second-group member must be held at a predetermined position. To this end a nut holder made of spring steel and slightly curving is used. More specifically, the nut and the nut holder are inserted together into the T-groove, such that the holder pushes, by virtue of its spring force, the nut onto a surface of the T-groove, thereby holding the nut at the predetermined position.

This conventional method of connecting a standardized member to another is disadvantageous in four respects. First, as the nut holder made of spring steel is made to slide in the T-grove to bring the nut to the desired position in the T-groove, it scratches the surfaces of the T-groove. Second, it is not easy to slide the nut holder to the desired position. Third, the nut holder gets rusted over a long use. Fourth, the nut holder is expensive since it is made of spring steel.

SUMMARY OF THE INVENTION

It is the object of the present invention to provide a connecting device for connecting a first member, such as a long aluminum member, to a second member, said device comprising a nut and a nut holder which can slide smoothly in a T-groove cut in one side of the first member and can reliably hold the nut at a predetermined position in the T-groove of the first member.

According to a first aspect of the present invention, there is provided a connecting device comprising a nut having a screw hole made in the center portion, and a nut holder shaped like a plate, made of synthetic resin and having a through hole having substantially the same diameter as the screw hole of the nut. The nut holder has two projections at the opposing ends, and a portion extending substantially at right angles to the projections, being able to be deformed elastically, and having a width greater than the width of the T-groove of a member, into which the nut and the nut holder are to be inserted. The nut is held in the gap between the projections, and the nut holder, holding the nut, is forcedly pushed into the T-groove, with its deformable portion elastically deformed.

According to a second aspect of this invention, there is provided a connecting device comprising an elongated nut and a nut holder shaped like a plate and made of synthetic resin. The nut has screw holes and recesses and can be inserted in a T-groove cut in a member and extending in the lengthwise direction of the member. The nut holder has projections and an elastically deformable portion. The nut is held on the nut holder, with the projections of the holder fitted in the recesses of the nut. The nut holder, thus holding the nut, is inserted in the groove of the member, with the deformable portion of the nut holder forcedly elastically bent inwardly.

According to a third aspect of the present invention, there is provided a connecting device comprising a nut having a screw hole made in the center portion, and a nut holder made of synthetic resin and having a through hole larger than the screw hole of the nut. The nut holder has two projections at the opposing ends, and one deformable portion extending substantially at right angles to the projections. The deformable portion can be deformed elastically, and has a width greater than the width of the T-groove of a member, into which the nut and the nut holder are to be inserted. The nut is held in the gap between the projections, and the nut holder, holding the nut, is forcedly pushed into the T-groove, with its deformable portion deformed elastically.

DETAILED DESCRIPTION OF THE PREFERRED EMBODIMENTS

Embodiments of the present invention will now be described, with reference to the accompanying drawings.

Figure 1:
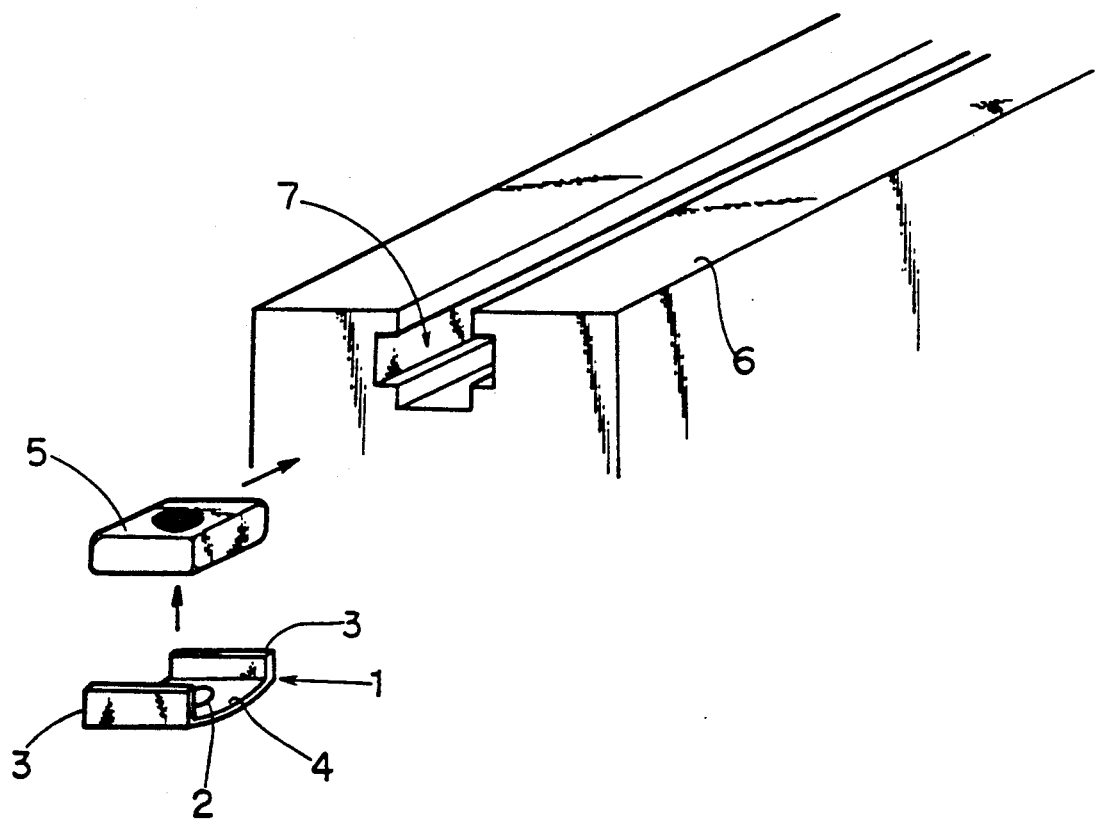
FIG. 1 is a perspective view showing a connecting device according to a first embodiment of the present invention.
Figure 2:
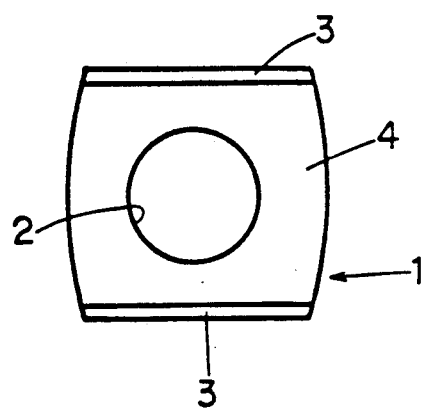
FIG. 2 is a front view showing of the nut holder of the connecting device shown in FIG. 1.
Figure 3:
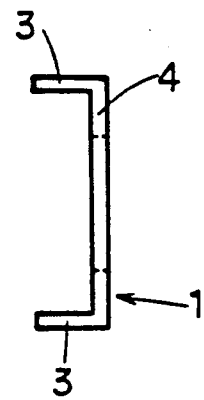
FIG. 3 is a right-side view illustrating the nut holder.

FIG. 1 through FIG. 3 illustrate the connecting device according to the first embodiment of the invention. As is shown in this figure, the connecting device comprises a nut holder 1 and a square nut 5. The nut holder 1 is a plate made of synthetic resin. As is best shown in FIG. 2, it has a through hole 2 cut in the center portion. As is clearly shown in FIG. 3, a first pair of two end portions of the nut holder 1 are bent, forming two projections 3. The remaining gently curved portion 4, which extends between the projections 3 at right angles thereto, is gently curved outwardly and can be deformed elastically. A gently curved end portion 4 is formed on each of the opposite sides of the central portion of nut holder 1 to provide a second pair of end portions; the gently curved end portions 4 of the second pair of end portions being positioned between the pair of projections 3 formed on the central portion.

As is shown in FIG. 1, the square nut 5 is pushed into the gap between the projections 3 of the nut holder 1, and the nut holder 1 is inserted into a T-groove 7 cut in one side of an elongated member 6 The elastically deformable portion 4 of the nut holder 1 is slightly bulging outward and has, thus, a width a little greater than the T-groove 7. Hence, when the nut holder 1 is pushed into the T-groove 7, the portion 4 is compressed, creating friction between the nut holder 1 and the surfaces of the T-groove 7. As a result, the square nut 5 is held at a desired position within the T-groove 7 of the member 6. Thus, another member can be connected to the member 6 at that desired position, by putting the bolt secured to the other member into screw engagement with screw hole of the nut 5.

Since the square nut 5 is held in the nut holder 1, while being inserted into the T-groove 7 and being moved to a desired position within the T-groove 7, it does not scratch the surfaces of the T-groove 7 at all. Further, since the nut 5 is held in the nut holder 1 by virtue of moderate friction, it can easily be moved in the nut holder 1, to have its screw hole axially aligned with the bolt of the other member which is to be fastened to the member 6.

Figure 4:
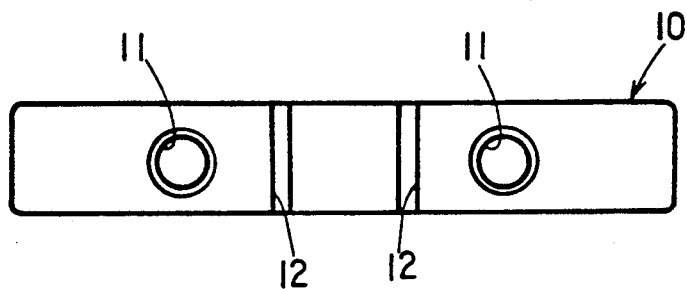
FIG. 4 is a front view of the elongated nut of a connecting device according to a second embodiment of the invention.
Figure 5:
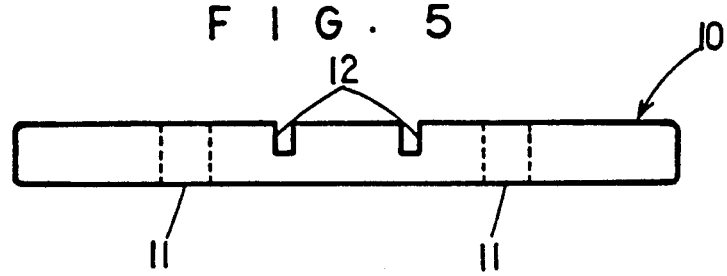
FIG. 5 is a bottom view of the elongated nut.
Figure 6:
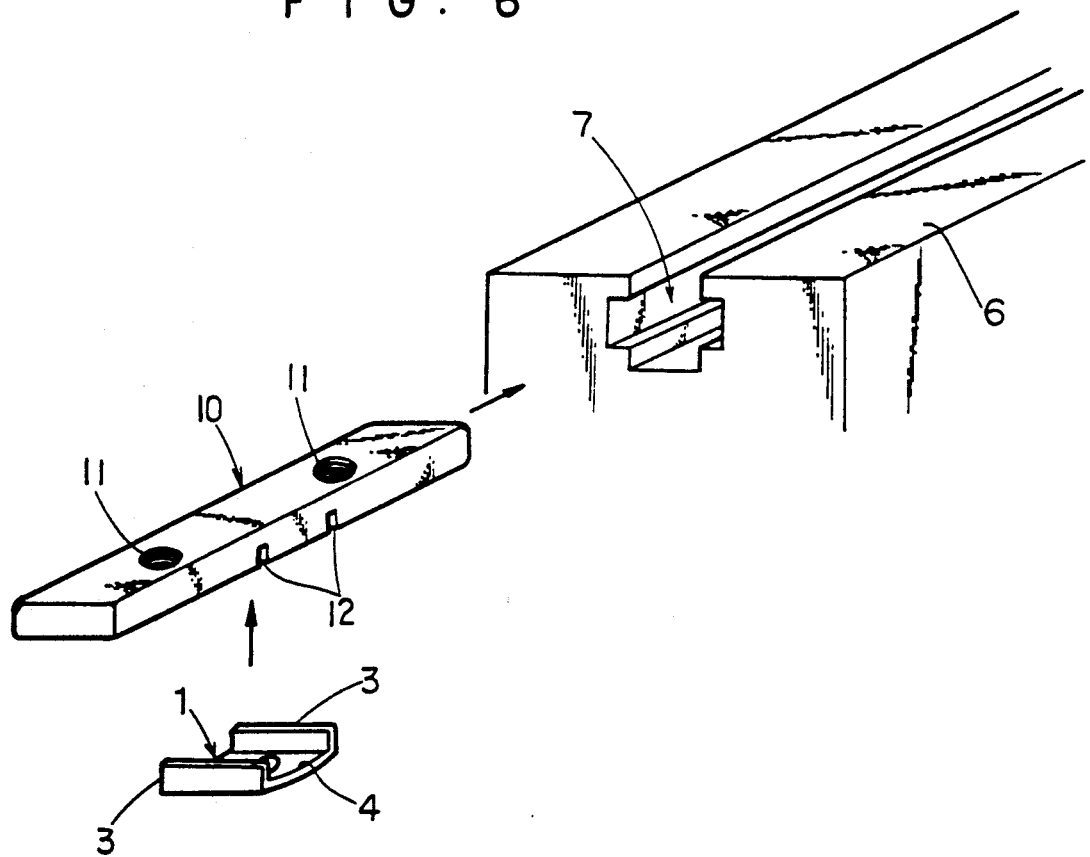
FIG. 6 is a perspective view illustrating a connecting device according to the second embodiment of the invention.

The connection device according to the second embodiment of the invention will now be described, with reference to FIG. 4 through FIG. 6. As is illustrated in FIG. 6, this device also comprises a nut holder 1 and a nut 10 which is elongated. As can be understood from FIG. 6, the nut holder 1 is identical in structure to the nut holder used in the first embodiment shown in FIGS. 1 to 3. As is shown in FIGS. 4 and 5, the elongated nut 10 has two screw holes 11 and two parallel grooves 2. The grooves 12 are cut in that portion of the elongated nut 10 which is located between the screw holes 11, and extend at right angles to the axis of the elongated nut 10.

As is shown in FIG. 6 the projection 3 of the nut holder 1 are fitted in the grooves 12 of the elongated nut 10, and the nut holder 1 and the elongated nut 10 are inserted into the T-groove 7 of the member 6. Once the nut holder 1 has been set in the T-groove 7, its deformable portion 4 is deformed elastically, generating friction between itself and the surfaces of the T-groove 7. By virtue of this friction, the elongated nut 10 is held at a desired position in the T-groove 7.

In the second embodiment, the nut holder 1 can easily hold the elongated nut 10 at any desired position in the T-groove 7 of the member 6. In addition, after another member (not shown) is connected to the member 6 by means of the connecting device, the elongated nut 10 disperses, to the member 6, the force exerted from the other member. This dispersion of force ensures a very firm connection of the two members.

Figure 7:
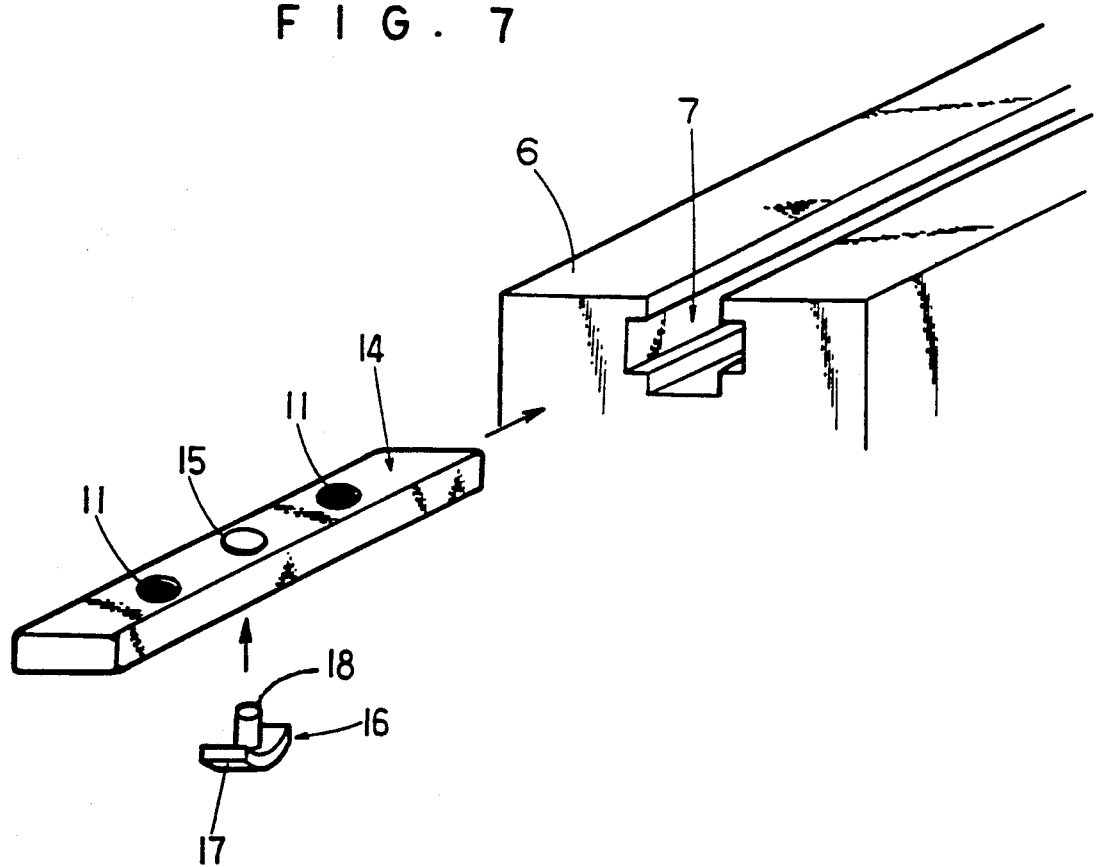
FIG. 7 is a perspective view showing connecting device according to a third embodiment of the present invention.

The connection device according to the third embodiment of this invention will now be described, with reference to FIG. 7.

As is illustrated in this figure, the device of the third embodiment comprises an elongated nut 14 and a nut holder 16. The elongated nut 14 has a through hole 15 made in the center portion, and two screw holes 11 located on the opposing sides of the hole 15. The nut holder 16 consists of an arcuate, elastically deformable portion 17 and a projection 18 which are integrally formed of synthetic resin. The deformable portion 17 has such a width that it can be inserted into the T-groove 7 of a member 6, and has such a height that it pushes the elongated nut 14 onto the surface of the T-groove 7.

With the third embodiment it is possible to hold the elongated nut 14 reliably at a desired position in the T-groove 7 of the member 6. Further, the through hole 15 can be made, along with the screw holes 11, thus enhancing the efficiency of forming the elongated nut 14.

The connecting device according to the fourth embodiment of the present invention will now be described, with reference to FIGS. 8 and 9.

This connecting device comprises a nut 20 and a nut holder 24 for holding the nut 20. As can be understood from FIGS. 8 and 9, the nut 20 has a trapezoidal cross section. The nut holder 24, which also has a trapezoidal cross section, is comprised of a pair of rectangular plates 22 and a pair of trapezoidal plates 23. The plates 23 connect the rectangular plates 22. The plates 23 have a width slightly greater than that of the T-groove 28 of a member 26, into which the nut holder 24 is to be inserted. As is shown in FIG. 9, the T-groove 28 has also a trapezoidal cross section. Hence, once set in the T-groove 28, the nut holder 24, and hence the nut 20 held therein, can smoothly move in the T-groove 18, without vibrating at all.

Figure 8:
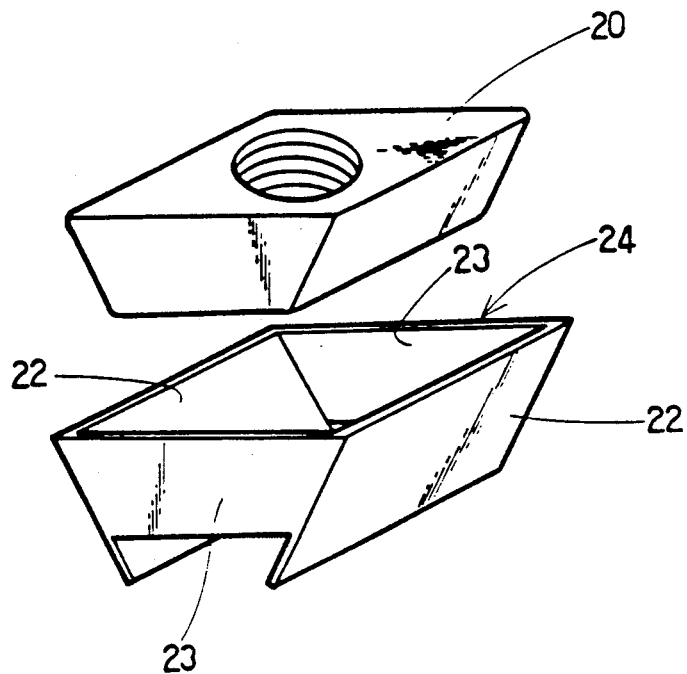
FIG. 8 is a perspective view showing a connecting device according to a fourth embodiment of this invention.
Figure 9:
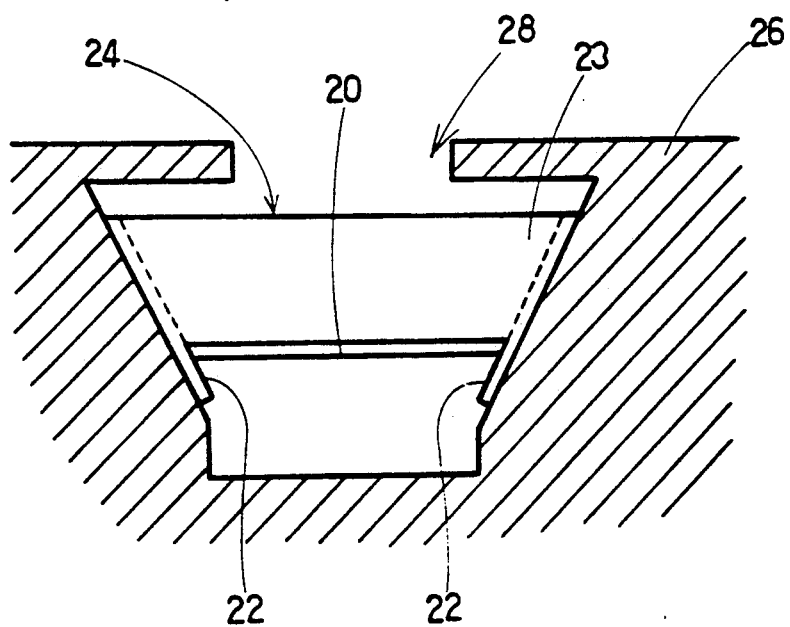
FIG. 9 is a partially sectional view illustrating the device shown in FIG. 8 in assembled position.

In order to fasten another member to the member 26, by means of connecting device shown in FIGS. 8 and 9, the nut 20 is set within the gap between the rectangular plates 22 of the nut holder 24. Then, the nut holder 24 is inserted into the T-groove 28 of the member 26. Since the width of the nut holder 24 is a little greater than that of the T-groove 28, the trapezoidal plates 23 of the nut holder 24 are compressed or elastically deformed, thus generating friction between the nut holder 24 and the surfaces of the T-groove 28. By virtue of the friction, the nut holder 24 can be held at any position within the T-groove 28. Thus, the other member can be connected to the member 26 at any desired position, as its bolt is put into the screw engagement with the trapezoidal nut 20.

With the fourth embodiment of the invention, it is possible to move the nut holder 24 smoothly in the T-groove 28, while holding the nut 20 steadily.

According to the present invention, the shapes of the nut and the nut holder are not limited to those described above. In other words, the nut and the nut holder can have any other shapes. For example the projections or elastically deformable portions of the nut holder can have any shapes so long as they hold the nut steadily at any desired position in the T-groove of a standardized member.

As has been described, in any embodiment of the invention, the nut holder made of synthetic resin holds the nut and remains in frictional contact with the surfaces of the T-groove of the standardized member, thus holding the nut at any desired position in the T-groove. Since the nut contacts none of the surfaces of the T-groove, it does not damage the surfaces of the T-groove. Further, the nut holder can smoothly move in the T-groove, without damaging the surfaces of the T-groove. Hence, the nut can easily be moved in the nut holder 1, to have its screw hole or holes axially aligned with the bolt or bolts of another member which is fastened to the standardized member. In addition, the nut holder, which is made of synthetic resin, does not get rusted and can be manufactured at low cost.

The connecting device according to the present invention can easily be assembled, merely by fitting the projections of the nut holder into the recesses made in the nut. Once in the T-groove of a standardized member, the connecting device, thus assembled, serves to connect firmly another standardized member to the member. The connecting member can, therefore, help to assemble a frame or the like comprised of standardized members.

What is claimed is:

1. A connecting device for connecting a first elongated member having a longitudinal axis and a second elongated member, said connecting device comprising:
   a T-shaped groove formed in said first elongated member extending along said longitudinal axis thereof, said T-shaped groove having internal surfaces defining a vertical portion and a cross-arm portion substantially perpendicular to said vertical portion, said cross-arm portion having a predetermined width;
   a nut holder having a length and a width, and comprising a synthetic resin plate, said nut holder including:
   a central portion;
   an aperture formed in said central portion;
   said width of said nut holder being slightly larger than said predetermined width of said cross-arm portion of said T-shaped groove;
   said central portion having:
     a plane surface;
     a first pair of end portions opposing each other;
     a second pair of end portions opposing each other;
     projections formed on said first pair of end portions integrally with said central portion, said projections extending substantially at right angles to said central portion;
     said second pair of end portions being positioned between said first pair of end portions;
     each of said second pair of end portions having a curved shape which is curved outwardly away from said central portion;
     the curved end portions of said second pair of end portions being elastically deformable;
   a nut held between said projections on said nut holder; and
   a screw hole formed in said nut, said screw hole being alignable with said aperture in said nut holder; and
   said nut holder with said nut held therein being insertable into said T-shaped groove when said curved end portions of said second pair of end portions of said nut holder are slightly deformed to permit said pair of curved shaped end portions to slidably fit into said cross-arm portion of said T-shaped groove, while said projections on said first pair of end portions maintain the nut out of contact with the internal surfaces of the T-shaped groove, said curved shaped second pair of end portions and said projections on said first pair of end portions together substantially preventing scratching in said cross-arm portion of said T-shaped groove as said nut holder with said nut held therein is moved in said T-shaped groove to a desired position.

2. A connecting device for connecting a first elongated member having a longitudinal axis and a second elongated member, said connecting device comprising:
   a T-shaped groove formed in said first elongated member extending along said longitudinal axis, said T-shaped groove having internal surfaces defining a vertical portion and a cross-arm portion substantially perpendicular to said vertical portion, said cross-arm portion having a predetermined width;
   a nut holder having a length and a width, and comprising a synthetic resin plate, said nut holder including:
   a central portion;
   said width of said nut holder being slightly larger than said predetermined width of said cross-arm portion of said T-shaped groove;
   said central portion having:
     a plane surface;
     a first pair of end portions opposing each other;
     a second pair of end portions opposing each other;
     projections formed on said first pair of end portions integrally with said central portion said second pair of end portion being positioned between said first pair of opposing end portions; and
     said projections extending substantially at right angles to said central portion;
     each of said second pair of end portions of said central portion having a curved shape which is curved outwardly away from said central portion;
     the curved end portions of each of said second pair of end portions being elastically deformable; and an elongated nut having:
     a plurality of screw holes formed therein; and
     at least two grooves formed therein for holding said projections formed on said nut holder;
   said nut holder with said elongated nut held by said projections being insertable into said T-shaped groove when said curved end portions of said second pair of end portions of said nut holder are slightly deformed to permit said second pair of curved shaped end portions of said nut holder to slidably fit into said cross arm portion of said T-shaped groove while said projections on said first pair of end portions maintain the nut out of contact with the internal surfaces of the T-shaped groove, said curved shaped second pair of end portions and said projections on said first pair of end portions together preventing scratching in said cross arm portion of said T-shaped groove as said nut holder with the nut held therein is moved to a desired position in said T-shaped groove.

3. The connecting device according to claim 2, further comprising an aperture formed in said central portion of said nut holder; and
   wherein one of said plurality of screw holes is aligned with said aperture formed in said central portion of said nut holder.

* * * * *